United States Patent [19]
Abe et al.

[11] Patent Number: 5,338,462
[45] Date of Patent: Aug. 16, 1994

[54] ACTIVE CARBON MATERIALS, PROCESS FOR THE PREPARATION THEREOF AND THE USE THEREOF

[75] Inventors: Hisaki Abe; Toshio Kondoh; Hideki Fukuda; Mayumi Takahashi; Tetsuo Aoyama; Masahiro Miyake, all of Niigata, Japan

[73] Assignee: Mitsubishi Gas Chemical Company, Inc., Tokyo, Japan

[21] Appl. No.: 76,770

[22] Filed: Jun. 15, 1993

Related U.S. Application Data

[62] Division of Ser. No. 805,174, Dec. 11, 1991, Pat. No. 5,242,879.

[30] Foreign Application Priority Data

Dec. 13, 1990 [JP] Japan .................. 2-410091
Dec. 13, 1990 [JP] Japan .................. 2-410092
Jun. 14, 1991 [JP] Japan .................. 3-169003
Nov. 8, 1991 [JP] Japan .................. 3-293239
Nov. 8, 1991 [JP] Japan .................. 3-293240

[51] Int. Cl.$^5$ .............. C02F 1/70; C02F 1/72
[52] U.S. Cl. ........................ 210/757; 210/758
[58] Field of Search ............. 210/756, 757, 694, 758

[56] References Cited

U.S. PATENT DOCUMENTS

| | | | |
|---|---|---|---|
| 1,151,553 | 8/1915 | Adler | 502/437 |
| 1,925,204 | 9/1933 | Reich | 502/437 |
| 2,148,579 | 2/1939 | Reich | 502/423 |
| 3,619,420 | 11/1971 | Kemmer et al. | 502/423 |
| 4,118,341 | 10/1978 | Ishibashi et al. | 502/437 |
| 4,197,272 | 4/1980 | Tighe | 502/180 |
| 4,209,393 | 6/1980 | Kalvinskas et al. | 502/437 |
| 4,298,578 | 11/1981 | Yan et al. | 423/7 |
| 4,832,881 | 5/1989 | Arnold et al. | 264/29.7 |
| 5,242,879 | 9/1993 | Abe et al. | 502/180 |

FOREIGN PATENT DOCUMENTS

| | | | |
|---|---|---|---|
| 3119707 | 12/1987 | Fed. Rep. of Germany. | |
| 2231621 | 12/1974 | France. | |
| 47-42492 | 12/1972 | Japan | 502/437 |
| 52-63894 | 5/1977 | Japan | 502/437 |
| 52-105594 | 5/1977 | Japan. | |
| 54-139880 | 10/1979 | Japan | 502/437 |
| 56-48290 | 5/1981 | Japan. | |
| 81/03167 | 11/1981 | World Int. Prop. O.. | |

Primary Examiner—Paul E. Konopka
Attorney, Agent, or Firm—Armstrong, Westerman, Hattori, McLeland & Naughton

[57] ABSTRACT

The present invention relates to specific activated carbon materials including from 1 to 5% by weight of nitrogen, from 3 to 30% by weight of oxygen and from 40 to 95% by weight of carbon, and having an average pore radius of from 15 to 30 Å, with the proviso that mesopores occupy at least 50% by volume based on the total pore volume, and also relates a process for the preparation thereof, and to the use thereof as catalysts.

9 Claims, No Drawings

ACTIVE CARBON MATERIALS, PROCESS FOR THE PREPARATION THEREOF AND THE USE THEREOF

This is a divisional of application Ser. No. 97/805,174 filed Dec. 11, 1991, now U.S. Pat. No. 5,242,879.

BACKGROUND OF THE INVENTION

1. Field of the Invention

The present invention relates to activated carbon materials suitable for the use in treatments for the decomposition of various compounds contained in waste water such as waste water withdrawn, for instance, from chemical plants, from semiconductor treatment plants, from metal surface treatment plants, etc. The active carbon materials are useful, for example, as catalysts for the decomposition of hydrogen peroxide, hydrazines or water pollutants such as quaternary ammonium salts, organic acids, sulfur-containing compounds and the like.

2. Related Art

At present, hydrogen peroxide is commercially produced on a large scale, and used in various industrial fields, for instance, as a bleaching agent for paper pulps and fibers, as fungicide and oxidizing agent for medical use, as a bleaching agent for foodstuffs, as agent for metal surface treatments and, as a cleaning agent for semiconductors.

However, if a hydrogen peroxide-containing waste water is directly poured into an ordinary waste water treatment tank or the like without any operations for the decomposition of hydrogen peroxide, then the hydrogen peroxide-containing waste water may cause an undesired increase of COD. Furthermore, when a hydrogen peroxide-containing waste water enters an apparatus for carrying out biologically activated sludge process, then the hydrogen peroxide is decomposed to generate gaseous oxygen, which will cause a flowing of suspensions in a sedimentation tank, so that there may be a undesired lowering of quality of refined water obtained by the water treatment.

Thus, hydrogen peroxide may cause various problems in waste water treatments. Therefore, hydrogen peroxide in a waste water is usually subjected to a treatment for the decomposition thereof before the waste water is discarded.

It is known that there are a number of methods for the decomposition of hydrogen peroxide, including (1) a decomposition method comprising the use of chemicals such as sodium bisulfite, (2) a decomposition method comprising the use of manganese dioxide as catalyst, (3) a decomposition method comprising the use of activated carbon, (4) a decomposition method comprising the use of enzymes such as catalase and the like.

However, in the method (1), the decomposition reaction results in evolution of gaseous sulfur dioxide, which causes an environmental pollution. In addition, it is necessary to use sodium bisulfite or the like in an amount twice as much as the stoichiometric amount based on the amount of hydrogen peroxide, and therefore the use of such a large amount of sodium bisulfite will result in an increase of operation costs. Furthermore, the excess sodium bisulfite may cause an increase of COD and hence a secondary environmental pollution. In the method (2), there is a leaching of manganese during the decomposition reaction. Particularly, there is a violent leaching of manganese under acidic conditions, and therefore an environmental pollution is caused by manganese. The method (3) generally has a low decomposition activity, and also has such a drawback that the effective life of the catalysts is rather short. The method (4) employs enzymes such as catalase, so that the pH of the reaction solution is limited to a neutral range, and that the reaction operation must be carried out at room temperature. Thus, these known methods have many problems, and therefore it is desirable to provide an improved method.

At present, hydrazine and salts and derivatives thereof, which are hereinafter referred to as "hydrazine(s)", are widely used as boiler water treating chemicals, reductants, agricultural chemicals, polymerization catalysts, foaming agents, agents for treating semiconductors, agents for water treatments and the like. In the case of the treatment of a hydrazine-containing waste water, an operation is conducted at the first time for the decomposition of hydrazines. A prior method for the decomposition of hydrazines comprises adding sodium hypochlorite to a hydrazine-containing waste water to effect an oxidative decomposition of hydrazines. The oxidative decomposition of hydrazine may be showed by the following reaction formula:

$$N_2H_4 + 4NaOCl \rightarrow 2H_2O + N_2 + O_2$$

In this reaction, use is made of a large amount of sodium hypochlorite, so that a high expense is necessary for this operation. In addition, there is a drawback that, after the oxidative decomposition treatment, a small amount of chlorine remains in the waste water.

Japanese Patent Applications (KOKAI) Nos. 91093/1978 and 91095/1978 disclose a method, wherein hydrazines are decomposed with air in the presence of heavy metals as catalysts. The decomposition of hydrazine with air may be shown by the reaction formula:

$$N_2H_4 + O_2 \rightarrow N_2 + 2H_2O$$

However, in this method, the decomposition velocity is low, and the decomposition of hydrazines is insufficient. Furthermore, there may be a secondary environmental pollution caused by the heavy metals. So, the known method cannot be regarded as an industrially useful method.

Furthermore, water pollution has increased in recent years with industrial development and exerts a great influence on the natural environment in rivers, lakes and seas. It is known that there are many methods or processes and much equipment for the treatment of waste water including other water pollutants described above. For example, such methods as biological treatment by activated sludge, methods of adsorption by activated carbon, methods of oxidation by ozone, and "Fenton" methods which effect oxidation using iron salts with such oxidants as hydrogen peroxide.

However, problems concerning these methods include the necessity, in methods which use activated sludge, of a large area for facilities and long treatment time as well as limitations on the kinds of organic compounds in the water pollutants. In adsorption methods, the volume of water pollutants that can be adsorbed is small, so a large amount of adsorbent is necessary, and the removal of the adsorbed pollutant is very complicated. Methods of decomposition by ozone are very expensive due to the high cost of equipment necessary for the production of ozone.

Treatment by the "Fenton" method, is a decomposition method which uses the oxidative ability of an oxidant (usually hydrogen peroxide) in the presence of iron salts, and since it is necessary to use more than one equivalent of iron (ferrous) ion per one equivalent of hydrogen peroxide, the volume of iron salt used is very large. The ferric ion produced by the treatment, after neutralization using a base, is precipitated using a polymer flocculant and is then recovered as sludge. For this reason, a large volume of sludge is produced and treatment of the sludge becomes necessary as well. Also, to the extent that a large amount of iron ion is used, it is also necessary to use a large volume of such chemicals as base and polymer flocculants. This causes such problems as high treatment costs. Additionally, in this method, if any hydrogen peroxide remains after treatment, the hydrogen peroxide itself becomes a factor in the increase of COD and has a negative effect upon the environment. Consequently, remaining hydrogen peroxide must be removed and this again creates the necessity of adding a large amount of iron (ferrous) ion which causes the amount of chemicals used and the amount of sludge produced to increase. In addition, the kinds of organic compounds in water pollutants which can be treated is very limited as well.

There are various problems in the prior art hydrogen peroxide, hydrazine or other water pollutant decomposition methods described above. The present invention provides a novel catalyst for the decomposition of hydrogen peroxide, hydrazine and other water pollutants which comprises activated carbon materials which can cause decomposition with no risk of secondary environmental pollution and which can be used in a broad pH range and exhibits high activity for the decomposition of hydrogen peroxide and hydrazine, and additionally, which causes the decomposition a wide range of water pollutants in a short time under mild conditions.

SUMMARY OF THE INVENTION

It has been now found that activated carbon materials, which have been obtained by subjecting proteins or protein-containing sludges or waste materials to carbonization and activation treatments, have a high activity as catalysts for the decomposition of hydrogen peroxide, hydrazines or water-pollutants, and can be advantageously and safely used as catalysts without causing any secondary environmental pollutions. Furthermore, it has been found that not only active carbon materials, which have been subjected to the above-mentioned carbonization and activation treatments, and then further subjected to an acid treatment and a heat treatment, but also activated carbon materials, which have been obtained by a heat treatment of polyacrylonitrile series activated carbon fibers, have a high catalytic activity and are very suitable as catalysts for the decomposition of hydrogen peroxide, hydrazines or such other water pollutants as organic acids, quaternary ammonium salts, and sulfur-containing compounds.

The invention relates to activated carbon materials comprising from 1 to 5% by weight of nitrogen, from 3 to 30% by weight of oxygen and from 40 to 95% by weight of carbon, and having an average pore radius of from 15 to 30 Å, with the proviso that mesopores occupy at least 50% by volume based on the total pore volume. The invention also relates to a method for producing the activated carbon materials, and to the use thereof as catalysts for the decomposition of hydrogen peroxide, hydrazines or other water pollutants.

DETAILED DESCRIPTION OF PREFERRED EMBODIMENTS

The activated carbon materials according to the invention may be produced by subjecting proteins or protein-containing sludges or waste materials to carbonization and activation treatments, or by subjecting polyacrylonitrile series carbon fibers to a heat treatment. It is important that the activated carbon materials should have a nitrogen content of from 1 to 5% by weight for exhibiting a high activity for the decomposition of hydrogen peroxide, hydrazines and water pollutants. If the nitrogen content is not in the range mentioned above, and particularly if the nitrogen content is less than 1% by weight, then the activity for the decomposition of hydrogen peroxide, hydrazines or water pollutants is undesirably low. Furthermore, it is recommended that the oxygen content and the carbon content should be in the ranges given above. If the oxygen content and the carbon content are not in the ranges given above, the activity for the decomposition of hydrogen peroxide, hydrazines or water pollutants is rather low, and hence the objects of the invention cannot be satisfactorily accomplished. After the activated carbon materials according to the invention have been subjected to the carbonization, activation and heat treatments, the activated carbon materials will generally have an oxygen content of from 3 to 30% by weight and a carbon content of from 40 to 90% by weight, and have a sufficient activity for the decomposition of hydrogen peroxide or hydrazines. If the activated carbon materials are further subjected to an acid treatment and then to a heat treatment after the above-mentioned activation treatment, then the activated carbon materials will have an oxygen content of from 3 to 10% by weight and a carbon content of from 70 to 95% by weight, and also have a further enhanced activity, so that the activated carbon materials are more suitable for the use in an operation, wherein either a highly acidic waste water containing hydrogen peroxide, or a waste water containing hydrogen peroxide, hydrazines or other water-pollutants in a high concentration is treated to rapidly decompose and remove the hydrogen peroxide, the hydrazines or other water-pollutants. Therefore, such an operation for the decomposition and the removal can be effectively carried out by selecting a suitable catalyst from a number of catalysts comprising the activated carbon materials according to the invention in consideration of the kinds of waste water to be treated in individual cases.

As mentioned above, the activated carbon materials according to invention have an average pore radius of from 15 to 30 Å. If the average pore radius is smaller than 15 Å or is larger than 30 Å, the activity for the decomposition of hydrogen peroxide, hydrazines other water-pollutants is undesirably low. So, it is advantageous that the average pore radius should be in the range shown above. Furthermore, in the active carbon materials according to the invention, mesopores should occupy at least 50% by volume based on the total pore volume. It is possible to further increase the volume of mesopores by effecting an acid treatment and then a heat treatment, after the above-mentioned activation treatment has been carried out. By such treatments, the volume of mesopores may be further increased to 60% by volume based on the total pore volume.

In the case of the activated carbon materials according to the invention, which are useful as catalysts for the decomposition of hydrogen peroxide, hydrazines or other water-pollutants, it is observed that the specific surface area is not critical, although it is preferred that the activated carbon materials should have a specific surface area of from 300 to 1500 $m^2/g$ in order to satisfactorily accomplish the objects of the invention. The measurements of average pore radius, specific surface area and mesopores of the activated carbon materials were made according to a nitrogen gas adsorption method, employing an autosorb apparatus manufactured by Yuasa Ionics Co., Ltd.

The activated carbon materials according to the invention may be prepared by subjecting proteins or protein-containing sludge or waste materials containing proteins (which are referred to as "organism-originated materials") to carbonization and activation treatments. As examples of proteins and protein-containing sludge for waste materials used or the production of the activated carbon materials according to the invention, there may be mentioned yeasts such as baker's yeasts, chlorella and the like; microbial proteins such as bacteria, algae, waste microbial materials obtained in yeast fermentation steps for the productions of beers or medicines, and fermentation residues obtained in amino acid fermentation operations, etc.; sludge obtained as remnants from biologically activated sludge used in treatments of industrial waste water, excrement, domestic waste water and the like. Furthermore, it is possible to use animal proteins such as fish, animal meat and blood, etc.; vegetable proteins such as beans e.g. soybeans and fatty soybeans, embryo buds of wheat and rice, etc. In view of the handling and the availability, it is preferred to use either microbial proteins such as yeasts, bacteria, algae, waste microbial materials obtained in fermentation operations and the like, or sludge obtained as remnants from biologically activated sludge, etc.

The catalysts comprising the activated carbon materials according to the invention can be cheaply produced, because the starting materials, used in the production of the catalysts, are proteins, protein-containing sludge or waste materials as mentioned above.

When the activated carbon materials are used as catalysts, it is possible to use the catalysts in the form of powder or shaped catalysts, depending on the objects, places and conditions for the use of the catalysts.

Molded catalysts comprising the activated carbon materials may be produced by a process, wherein the starting materials, such as proteins, protein-containing sludge or waste materials, are shaped, and thereafter subjected to a carbonization treatment, an activation treatment, a washing operation with acids and then a heat treatment. In the shaping operation, use is optionally made of binder. As examples of binder, there may be mentioned organic binder such as tar pitch, lignin, molasses, sodium alginate, carboxymethylcellulose (CMC), various synthetic resins, polyvinyl alcohol, starch, etc.; and inorganic binder such as smectite, water glass and the like. These binders may be used in such an amount that a shaping operation is feasible. In general, it is sufficient that the binders are employed in an amount of from 0.05 to 2% by weight on the basis of the amount of the starting materials.

In the course of the production of the activated carbon materials according to the invention by using organism-originated materials, there is a carbonization treatment step, wherein non-carbonaceous components are removed from the starting materials, such as proteins, protein-containing sludge or waste materials, so that a material suitable for the next activation treatment is obtained. The carbonization treatment is carried out usually at temperature of from 150° to 600° C., preferably from 200° to 500° C. for a period of time of from several minutes to several hours, while air, nitrogen, gaseous carbon dioxide or a mixture thereof is introduced thereinto. If there has occurred a fusion on the powdered or shaped starting materials such as proteins, protein-containing sludge and powdered waste materials, then it is difficult to provide a product which is so designed to form desired pores therein. Thus, such a fusion will give an adverse influence on the next activation treatment, and hence will not result in the production of any desired activated carbon materials having good properties. In order to avoid any fusion, it is preferred to add a small amount of iron compounds to the starting materials. By using iron compounds, it is possible to effectively suppress any fusion and also to improve the workability of the carbonization treatment, so that a uniform carbonization treatment can be accomplished. Examples of iron compounds used for this purpose are inorganic iron compounds and salts thereof such as ferrous sulfate, ferric sulfate, ferrous ammonium sulfate, ferric ammonium sulfate, ferric nitrate, ferrous chloride, ferric chloride, ferrous phosphate, ferric phosphate, ferrous carbonate, ferrous hydroxide, ferric hydroxide, ferrous silicate, ferrous sulfide, ferric sulfide and the like; and iron compounds of organic acids and salts thereof such as ferric citrate, ferric ammonium citrate, ferrous oxalate, ferric ammonium oxalate and the like. These iron compounds may be added in an amount of from 1 to 20% by weight to the starting materials.

After the carbonization treatment mentioned above, an activation treatment is carried out in a gaseous atmosphere consisting mainly of steam, gaseous carbon dioxide and oxygen at a temperature of from 700° to 1100° C., preferably from 800° to 1000° C. for a period of time of from several minutes to several hours, whereby the porous structure, which has been formed in the preceding carbonization treatment, may be further grown, developed or matured so as to form a finer microstructure.

In the course of the production of the activated carbon materials according to the invention, the carbonization treatment and the activation treatment may be carried out in any of internal or external heating type rotary kilns, tubular furnaces, continuous multistage kilns and the like.

In the production of the activated carbon materials according to the invention from the starting materials such as proteins, protein-containing sludge or waste materials, the starting materials are subjected to the carbonization treatment and the activation treatment as mentioned above. After these treatments, the starting materials may be further subjected to an acid treatment and a heat treatment to further enhance the activity of the material. In the acid treatment, use is usually made of inorganic acids such as sulfuric acid, hydrochloric acid, nitric acid, hydrofluoric acid and the like in the form of aqueous solutions having a concentration of from 5 to 50% by weight. The acid treatment may generally be effected at a temperature of from room temperature to 100° C. for a period of time of from several minutes to several hours. After the acid treatment, a washing operation is carried out with the use of water, and then a heat treatment is performed in an atmosphere comprising, for instance, an inert gas such as nitrogen, helium, argon, gaseous carbon dioxide or the like, or a reducing gas such as hydrogen, ammonia, carbon monoxide or the like, at a temperature of from 400° to 1100° C., preferably from 500° to 1000° C. for a period of time of from several minutes to several hours.

According to the invention, the above-mentioned acid treatment is carried out for the purpose of removing any impurities from the activated carbon materials. The heat treatment has such an effect that a further growth, development or aging can be accomplished for the five structures, present in the portions where impurities have been removed. So, by carrying out the heat treatment after the acid treatment, it is possible to further enhance the activity of the carbon materials as catalysts for the decomposition reactions, so that the activity thus enhanced is far higher than the activity observed before the acid treatment.

The activated carbon materials according to the invention can be produced not only from the above-mentioned organism-originated materials such as proteins, protein-containing sludge or waste materials but also from polyacrylonitrile series carbon fibers. Such polyacrylonitrile series carbon fibers may be used in various forms, for example, ordinary fibers, felts, mats, fabrics, etc., depending, for instance, on the objects, places and conditions for the use of the aimed catalysts.

When the polyacrylonitrile carbon fibers are used as the starting materials, the activated carbon materials according to the invention can be produced by a process, wherein the starting polyacrylonitrile carbon fibers, having a suitable form, are subjected to a heat treatment in an atmosphere consisting either of an inert gas such as nitrogen, helium, argon, carbon dioxide or the like, or of a reducing gas such as hydrogen, ammonia, carbon monoxide or the like, at a temperature of from 400° to 1100° C., preferably from 500° to 1000° C. for a period of time of from several minutes to several hours.

The polyacrylonitrile carbon fibers used in the invention may be activated carbon fibers produced by a process, wherein acrylonitrile is copolymerized with one or more other copolymerizable monomers such as vinyl chloride, vinylidene chloride, acrylic acid, acrylic acid derivatives, methacrylic acid, methacrylic acid derivatives, acrylamide, N-methylolacrylamide, allylsulfonic acid, methallylsulfonic acid and the like, and wherein the resulting polymeric products are then subjected to spinning, infusibilization, and activation operations.

The decomposition of hydrogen peroxide with the aid of the activated carbon materials according to the invention as catalysts may generally be conducted by a process, which comprises contacting the catalysts according to the invention with aqueous solutions, organic solvents or waste water which contain hydrogen peroxide. Other processes may also be carried out, for instance, it is possible to contact the catalysts according to the invention with hydrogen peroxide having a form of mist or vapor.

When hydrogen peroxide contained in a liquid to be treated is decomposed with the aid of the catalysts comprising the activated carbon materials according to the invention, there are no specific limitations on the nature and properties of liquid to be treated, for instance, the pH and the hydrogen peroxide content of liquid. Thus, the nature of liquid to be treated may vary over a wide range. The decomposition of hydrogen peroxide with the aid of the catalysts according to the invention may be effected in either a batch process or a continuous process. The temperature, time, etc., of the operation may be varied depending, for instance, on the kinds of liquid to be treated.

When hydrazines are decomposed with the aid of the activated carbon materials according to the invention as catalysts, it is advantageous to effect the decomposition reaction in the presence of an oxygen generator agent, so that hydrazines can be decomposed very effectively.

As the oxygen generator agents mentioned above, it is generally possible to use peroxide compounds, including, for instance, hydrogen peroxide, sodium percarbonate, sodium perborate and the like. The decomposition of hydrazine in the presence of hydrogen peroxide may be illustrated by the following reaction scheme:

$$N_2H_4 + 2H_2O_2 \rightarrow N_2 + 4H_2O$$

In the case of the decomposition reaction mentioned above, it is theoretically possible to use 2 equivalents of hydrogen peroxide per 1 equivalent of hydrazine, although, in practice, hydrogen peroxide is employed in a slightly excess amount. However, the amount of hydrogen peroxide used in this case is far smaller than the amount of sodium hypochlorite in the case of a decomposition reaction employing sodium hypochlorite. In addition, it is observed that, in the case of the decomposition of hydrazines in the presence of hydrogen peroxide with the aid of a catalyst comprising the activated carbon materials according to the invention, there is no production of any undesirable products which may cause a secondary environmental pollution, so that this method can be safely carried out.

When a hydrazine-containing liquid is treated to decompose hydrazines contained therein, the pH of the liquid has an influence on the decomposition velocity. In the case of a known activated carbon which is customarily used in water treatments, such an activated carbon will not exhibit any substantial action for the decomposition of hydrazines contained in a liquid as far as the liquid has an alkaline pH. On the other hand, a catalyst comprising the activated carbon materials according to the invention is sufficiently effective in a wide pH range under no virtual influence of the kinds of liquid to be treated.

The operations for the decomposition of hydrazines with the aid of the activated carbon materials according to the invention as catalysts may be carried out in either a batch process or a continuous process. The temperature, time, etc. of the operations may suitably be selected depending, for instance, on the kinds of liquids to be treated.

Next, the invention will be illustrated in more detail by the Examples.

When water pollutants are decomposed using the activated carbon materials of this invention, it is possible to achieve particularly effective decomposition in the presence of oxidant and iron ion in solution. The oxidant used in the present invention is usually a peroxide compound and such peroxides as hydrogen peroxide, calcium peroxide, ammonium peroxide, sodium percarbonate, and sodium perborate may be used as the peroxide compound. However, practically, from the standpoint of cost and by-products, hydrogen peroxide is preferred. The amount of hydrogen peroxide used is not limited but may be determined according to the content of the waste water to be treated, and generally a concentration of 0.5–20 ppm hydrogen peroxide per 1 ppm. of pollutants in waste water is added. The effectiveness of decomposition for hydrogen peroxide at concentrations lower than the range described above is low and if the amount of hydrogen peroxide used is greater than that range, the rate of decomposition of hydrogen peroxide becomes very large.

Moreover, the iron salt used in the present invention may consist of such salts as sulfates, chlorides and nitrates in any form which may produce iron ion. However, from a practical standpoint, ferrous sulfate is preferred. The amount of iron salts used is in a range of 0,001-1 equivalents of iron ion per 1 equivalent of hydrogen peroxide.

When waste water containing water pollutants is treated with the activated carbon materials of this invention, it is usually treated under acidic conditions. The treatment is generally carried out in a pH range of 4.0 or less and preferably in the range between 2.0-4.0.

The water pollutants in waste water which are appropriate for treatment by the present invention are not limited and, generally, sewage, industrial waste water, and other waste water are all suitable. Since water pollutants such as organic acids, quaternary ammonium salts, and sulfur containing compounds which can only be decomposed with difficulty using such prior art methods as the "Fenton" method and biological treatment by activated sludge can suitably be treated by the present invention a wide range of water pollutants can be decomposed.

The decomposition of water pollutants using the activated carbon materials of the present invention may be carried out either cyclically or on a continuous basis. Treatment conditions such as the treatment temperature and the treatment time period can be suitably selected according to the kind of waste water to be treated.

Next, the invention will be illustrated in more detail by the Examples.

EXAMPLE 1

1000 parts (by weight) of wasted cell debris of factors (cell debris of methanol assimilating bacteria), 200 parts of ferric nitrate, 20 parts of polyvinyl alcohol and 1000 parts of water are mixed with one another and kneaded in a kneader. The resulting mixture was granulated to form a molded product, which was then subjected to a carbonization treatment at 250°-500° C. under an introduction of air for 3 hours, and thereafter to an activation treatment in the presence of steam at 1000° C. for 2 hours to give 256 parts of an activated carbon material. The resulting activated carbon material contained 2.3% by weight of nitrogen, 22.8% by weight of oxygen and 48.2% by weight of carbon, and had an average pore radius of 21 Å, while mesopores occupied about 55% by volume based on the total pore volume.

EXAMPLE 2

1000 parts of a dried sludge, obtained as dried excess sludge in an apparatus for the biologically activated sludge process disposed in a chemical plant, were admixed with 600 parts of water, then sufficiently kneaded in a kneader, and granulated to form a shaped product. Thereafter, the shaped product was subjected to a carbonization treatment at 200°-500° C. in a gaseous nitrogen atmosphere for 2 hours, and then to an activation treatment in the presence of a steam-gaseous carbon dioxide mixture (mixing ratio of 1:1 (volume ratio)) at 800° C. for 1 hour to give 221 parts of an active carbon material. The activated carbon material contained 2.7% of nitrogen, 8.8% by weight of oxygen and 77.7% by weight of carbon, and had an average pore radius of 26 Å, while mesopores occupied about 68% by volume based on the total pore volume.

EXAMPLE 3

A starting material similar to that shown in Example 1 (waste fungus bodies) was subjected to a carbonization treatment and then to an activation treatment under conditions similar to those shown in Example 1. Then the material was treated with a 30% by weight aqueous solution of hydrochloric acid under heating to 90° C. for 2 hours. The material was thereafter washed with water, and heated to 800° C. in a gaseous carbon dioxide atmosphere for 1 hour to give 202 parts of an activated carbon material containing 3.2% by weight of nitrogen, 8.2% by weight of oxygen and 81.6% by weight of carbon, and having an average pore radius of 19 Å, while mesopores occupied about 61% by volume based on the total pore volume.

EXAMPLE 4

A starting material similar to that shown in Example 2 (dried excess sludge obtained in an apparatus for the biologically activated sludge process) was subjected to a carbonization treatment and an activation treatment under conditions similar to those shown in Example 2. Then the material was subjected to a treatment, wherein a 50% by weight aqueous solution of sulfuric acid was used, and a heating to 60° C. was effected for 5 hours. Then the material was washed with water, and heated to 900° C. in a gaseous hydrogen atmosphere for 1 hour to give 189 parts of an activated carbon material, which contained 4.1% by weight of nitrogen, 7.6% by weight of oxygen and 83.2% by weight of carbon, and had an average pore radius of 26 Å, while mesopores occupied about 73% by volume based on the total pore volume.

EXAMPLE 5

100 g of polyacrylonitrile activated carbon fiber "FE-400" (manufactured by Toho Rayon Co., Ltd.) were heated in a tubular furnace in a gaseous nitrogen atmosphere to 950° C. for 1 hour to obtain 89 g of an activated carbon material, which contained 2.1% by weight of nitrogen, 8.5% by weight of oxygen and 86.8% by weight of carbon, and an average pore radius of 20 Å, while mesopores occupied about 56% by weight based on the total pore volume.

EXAMPLE 6

A test on the decomposition of hydrogen peroxide contained in an aqueous solution was conducted by using the activated carbon materials shown in Examples 1 and 2 as catalysts. In this test, each container was charged with 800 g of a waste water with a pH of 6.5 withdrawn from a factory and containing 4130 ppm of hydrogen peroxide. Each waste water sample was admixed under stirring at 25° C. with 0.15 g of a catalyst comprising the activated carbon material obtained in Example 1 or 2. During 30 minutes, the hydrogen peroxide content in the waste water was repeatedly determined. It was observed that about 93% of hydrogen peroxide had been decomposed after 15 minutes, and that about 100% of the peroxide had been decomposed after 30 minutes.

A further test was carried out, wherein use was made of the above-mentioned waste water, and of the activated carbon materials shown in Examples 3, 4 or 5 as catalysts. In each test, 0.11 g of the catalyst was used. Each sample was stirred at 25° C. The hydrogen peroxide concentration in each waste water sample was repeatedly determined during 30 minutes. It was observed in each case that about 90% of hydrogen peroxide had been decomposed after 10 minutes, and that about 100% of the peroxide had been decomposed after 20 minutes.

Comparative Example 1

A test on the decomposition of hydrogen peroxide was conducted under conditions similar to those shown in Example 6, except that use was made of 0.15 g of a commercial activated carbon designed for water treatments, "Diasorb G" (manufactured by Mitsubishi Chemical Industry Co., Ltd.). It was observed that the hydrogen peroxide decomposition rate after 30 minutes was only about 5%. The activated carbon "Diasorb G" contained 0.5% by weight of nitrogen, 5.6% by weight of oxygen and 90.8% by weight of carbon, and had an average pore radius of 13 Å, while mesopores occupied about 15% by volume based on the total pore volume.

EXAMPLE 7

A test was conducted on the decomposition of hydrogen peroxide contained in a waste water withdrawn from a metal surface treatment step. In this test, use was made of the activated carbon materials obtained in Examples 1 and 2.

Each container was charged with 800 g of a waste water with a pH of 2 (acidic due to the presence of sulfuric acid) withdrawn from a metal surface treatment step and containing 4500 ppm of hydrogen peroxide. The waste water was then admixed with 0.15 g of the activated carbon material obtained in Example 1 or 2 as a catalyst, and the resultant mixture was stirred at 25° C. Thereafter, the hydrogen peroxide concentration in the waste water was repeatedly determined during 60 minutes. In each test, it was observed that about 97% of the hydrogen peroxide had been decomposed after 30 minutes, and that about 100% of the peroxide had been decomposed after 45 minutes.

Another test was performed, wherein use was made of the above-mentioned hydrogen peroxide-containing waste water, and also use was made of the activated carbon materials obtained in Example 3, 4 and 5 as catalyst. The conditions of the test were similar to those of the afore-mentioned test. The hydrogen peroxide concentration in the waste water was repeatedly determined during 60 minutes. In each test, it was observed that about 95% of hydrogen peroxide had been decomposed after 25 minutes, and that about 100% of the peroxide had been decomposed after 35 minutes.

COMPARATIVE EXAMPLE 2

A test was carried out on the decomposition of hydrogen peroxide contained in a waste water withdrawn from a metal surface treatment process. In this test, use was made of the same waste water as that shown in Example 7, and also use was made of the same catalyst as that employed in Comparative Example 1. The hydrogen peroxide decomposition rate after 45 minutes was only about 5%, and the rate after 60 minutes was less than 10%.

EXAMPLE 8

A test was conducted on the decomposition of hydrazine contained in a hydrazine-containing ammonia water.

A waste water, withdrawn from a chemical plant and containing 28% by weight of ammonia and 700 ppm of hydrazine, was admixed with hydrogen peroxide, so that the resulted solution had a hydrogen peroxide content of 7000 ppm.

Each container was charged with 800 g of the waste water. The waste water was admixed with 0.3 g of the activated carbon material obtained in Example 1 or 2. Then the resultant mixture was stirred at 25° C. The hydrazine concentration in the waste water was repeatedly determined during 60 minutes. In each test using any of the catalysts, it was observed that about 82% of hydrazine had been decomposed after 30 minutes, and that about 99% of hydrazine had been decomposed after 60 minutes.

EXAMPLE 9

A test was carried out on the decomposition of hydrazine contained in a hydrazine-containing waste water withdrawn from a boiler, instead of a test on a hydrazine-containing ammonia water as shown in Example 8.

Waste water from a boiler containing 700 ppm of hydrazine was admixed with hydrogen peroxide, so that the resulted solution had a hydrogen peroxide content of 3000 ppm. Each container was charged with 800 g of this solution. The solution was admixed with the activated carbon material obtained in Example 1 or 2, and stirred at 25° C. The hydrazine concentration in the waste water was repeatedly determined during 60 minutes. In each test, it was observed that the about 88% of hydrazine had been decomposed after 30 minutes and that about 99% of hydrazine had been decomposed after 60 minutes.

COMPARATIVE EXAMPLE 3

A test was carried out on the decomposition of hydrazine in a waste water under conditions similar to those shown in Example 9. In this test, use was made of a waste water similar to that employed in Example 9, and furthermore use was made of an activated carbon similar to that shown in Comparative Example 1. About 33% of hydrazine had been decomposed after 30 minutes and about 48% of hydrazine had been decomposed after 60 minutes.

EXAMPLE 10

(The Decomposition of Water Pollutants)

Each container was charged with 5000 g of waste water containing 500 ppm of acetic acid. To the waste water was admixed 1.0 g of the activated carbon material obtained in Examples 1 and 2 and 1.5 g of ferrous sulfate. Concentrated sulfuric acid was added until the pH of the resulting solution was 2.7. Then the resultant mixtures were stirred at 27° C. After starting stirring, 27.9 g of 31% by weight hydrogen peroxide were added by a pump over 50 minutes and 60 minutes after the start of stirring the stirring was stopped. The percentage of the acetic acid in the waste water which had decomposed was determined to be about 94%.

In addition, activated carbon materials obtained in Examples 3, 4 and 5 were used as the catalyst and the waste water decomposition test was performed on the same waste water as described above and under the same conditions as described above. The percentage of acetic acid in the waste water which had decomposed was determined to be about 98% after 60 minutes for all of the catalysts.

COMPARATIVE EXPERIMENT 4

A decomposition experiment on the same waste water as in Example 10 was performed using the same catalyst as in Comparative Experiment 1. The results were that the decomposition of acetic acid did not exceed about 18%.

COMPARATIVE EXPERIMENT 5

In a decomposition experiment on the same waste water that was the same as that in Example 10 except that activated carbon material was not used the decomposition was only 4%.

EXAMPLE 11

Each container was charged with 5000 g of factory waste water containing 500 ppm of tetramethyl ammonium hydroxide (TMAH). The waste water was admixed with 4.0 g of activated carbon material-obtained in Examples 1, 2 and 5 and 3.0 g of ferrous sulfate heptahydrate. Concentrated sulfuric acid was added until the pH of the resulting solution was 2.7. Then, the solutions were stirred at 27° C. After starting stirring 66.2 grams of 34% by weight hydrogen peroxide were added over 100 minutes by a pump. The stirring was stopped after 110 minutes and the percentage of TMAH in the waste water which had decomposed was determined to be about 92%.

Moreover, when the activated carbon material obtained in Examples 3 and 4 above were used, after 80 minutes, about 95% of TMAH was decomposed.

COMPARATIVE EXPERIMENT 6

A decomposition experiment on the same TMAH in waste water as in Example 11 above was performed using 6.0 g of the same catalyst as was used in Comparative Experiment 1 above. The results were that the decomposition of TMAH did not exceed about 11%.

COMPARATIVE EXPERIMENT 7

The results of a decomposition experiment of the same TMAH in waste water which was the same as Example 11 except that activated carbon materials were not used was that the decomposition was only 2%.

EXAMPLE 12

Each container was charged with 5000 g of factory waste water containing 500 ppm of Sulfolane. The waste water was admixed with 5.0 g of activated carbon material obtained in Examples 1, 2 and 5 and 3.0 g of ferrous sulfate heptahydrate. Concentrated sulfuric acid was added until the pH of the resulting solution was 2.7. Then, the solutions were stirred at 27° C. After starting stirring 27.2 grams of 34% by weight hydrogen peroxide were added over 80 minutes by a pump. The stirring was stopped 90 minutes later and the percentage of the Sulfolane in the waste water which had decomposed was determined to be about 92%. Moreover, when the activated carbon material obtained in Examples 3 and 4 above were used, 80 minutes later, the percentage of Sulfolane in the waste water which had decomposed was determined to be about 96%.

COMPARATIVE EXPERIMENT 8

A decomposition experiment on the same Sulfolane in waste water as in Example 12 above was performed using 6.0 g of the same catalyst as was used in Comparative Experiment 1 above. The results were that the decomposition of Sulfolane did not exceed about 22%.

The activated carbon materials according to the invention are effective as catalysts for the decomposition of hydrogen peroxide, hydrazines other water pollutants such as organic acid, quaternary ammonium salt, and sulfur-containing compound and the like, and hence useful in treatments of waste water such as those withdrawn from chemical plants and from semiconductor treatment apparatuses. When hydrogen peroxide, hydrazines or other water pollutants above are decomposed with the aid of catalysts comprising the activated carbon materials according to the invention, such catalysts may be used in a wide pH range. In addition, the catalysts have a high activity for a long period of time, and it is possible to decompose the catalysts without causing any secondary public pollutions.

We claim:

1. A method for decomposition of a water-polluting material comprising subjecting protein-containing sludge or a waste material comprising microbial proteins or biologically activated sludge to carbonization, with or without shaping said sludge or waste materials, at a temperature of from 150° C. to 600° C., thereby producing carbonized material, subjecting said carbonized material to an activation treatment at a temperature of from 700° C. to 1,100° C. under an inert gas or a reducing gas atmosphere consisting essentially of steam or gaseous carbon dioxide, thereby producing an activated carbon material, contacting said water polluting material with said activated carbon material for a time sufficient to decompose at least a portion of said water polluting material, wherein said activated carbon material comprises from 1 to 5% by weight of nitrogen, from 3 to 30% by weight of oxygen and from 40 to 95% by weight of carbon, said activated carbon material having an average pore radius of from about 15 to 30 Å, with the proviso that mesopores occupy at least 50% by volume.

2. The method of claim 1, wherein said water polluting material comprises hydrogen peroxide.

3. The method of claim 1, wherein said water polluting material comprises hydrazine.

4. The method of claim 1 wherein said water polluting material is selected from the group consisting of hydrogen peroxide, hydrazines, quaternary ammonium salts, organic acids and sulfur-containing compounds.

5. A method for decomposition of a water-polluting material which comprises subjecting protein-containing sludge or a waste material comprising microbial proteins or biologically activated sludge to carbonization, with or without shaping said sludge or waste material, at a temperature of from 150° C. to 600° C. thereby producing carbonized material, subjecting said carbonized material to an activation treatment at a temperature of from 700° C. to 1,100° C. under an inert gas or a reducing gas atmosphere consisting essentially of steam or gaseous carbon dioxide, thereby producing an activated material, subjecting said activated material to an acid treatment to remove impurities followed by washing and drying, and subsequently to a heat treatment at from 400° C. to 1,100° C. under an inert gas or a reducing atmosphere, thereby producing an enhanced activated carbon material, contacting said water polluting material with said enhanced activated carbon material for a time sufficient to decompose at least a portion of said water polluting material, wherein said enhanced activated carbon material comprises from 1 to 5% by weight of nitrogen, from 3 to 10% by weight of oxygen and from 70 to 95% by weight of carbon, said activated carbon material having an average pore radius of from about 15 to 30 Å, with the proviso that mesopores occupy at least 50% by volume.

6. A method as claimed in claim 5, wherein said inert gas is at least one member selected from the group consisting of nitrogen, helium, argon and carbon dioxide, and said reducing gas is at lease one member selected from the group consisting of hydrogen, ammonia and carbon monoxide.

7. The method of claim 5, wherein said water polluting material comprises hydrogen peroxide.

8. The method of claim 5, wherein said water polluting material comprises hydrazine.

9. The method of claim 5 wherein said water polluting material is selected from the group consisting of hydrogen peroxide, hydrazines, quaternary ammonium salts, organic acids and sulfur-containing compounds.

* * * * *